Feb. 11, 1941.    M. G. BOERGER    2,231,518
TESTING APPARATUS FOR RADIATOR CORES
Filed Nov. 20, 1937    5 Sheets-Sheet 5

Inventor:
Martin G. Boerger
By: Hill & Hill, Attys.

Witness:
V. Silyander

Patented Feb. 11, 1941

2,231,518

UNITED STATES PATENT OFFICE 2,231,518

TESTING APPARATUS FOR RADIATOR CORES

Martin G. Boerger, Racine, Wis., assignor to Modine Manufacturing Company, Racine, Wis., a corporation of Wisconsin Application November 20, 1937, Serial No. 175,585

9 Claims. (Cl. 73—51)

This invention relates to testing apparatus, and particularly to apparatus for testing radiator cores of the type comprising spaced header plates and a plurality of tubes extending between and having their respective end portions mounted in the respective plates.

One object of the present invention is to provide a novel construction and arrangement for handling radiator cores and for testing the core to detect and locate possible leaks therein.

Another object of the invention is to provide means for supporting and submerging a radiator core in a tank of water or the like, testing the core for leaks and elevating or raising it from the tank for removal from the apparatus.

Another object of the invention is to provide an apparatus of novel structure, which may be readily adapted for handling radiators of various lengths.

Another object of the invention is to provide a novel construction and arrangement for conveniently and quickly sealing the end portions of the radiator core and injecting air into the core for detecting possible leaks therein.

Another object of the invention is to provide novel test fixtures which may be readily connected to the core, and wherein the fixture may be readily adapted to cores of various widths.

A further object of the invention is to provide a test fixture of novel construction which may be readily adapted for use in conjunction with radiator cores of various thicknesses.

A still further object of the invention is to improve devices of the character described in sundry details hereinafter referred to and particularly pointed out in the appended claims.

One embodiment of the present invention is shown for illustrative purposes in the accompanying drawings, in which.

Figure 1:
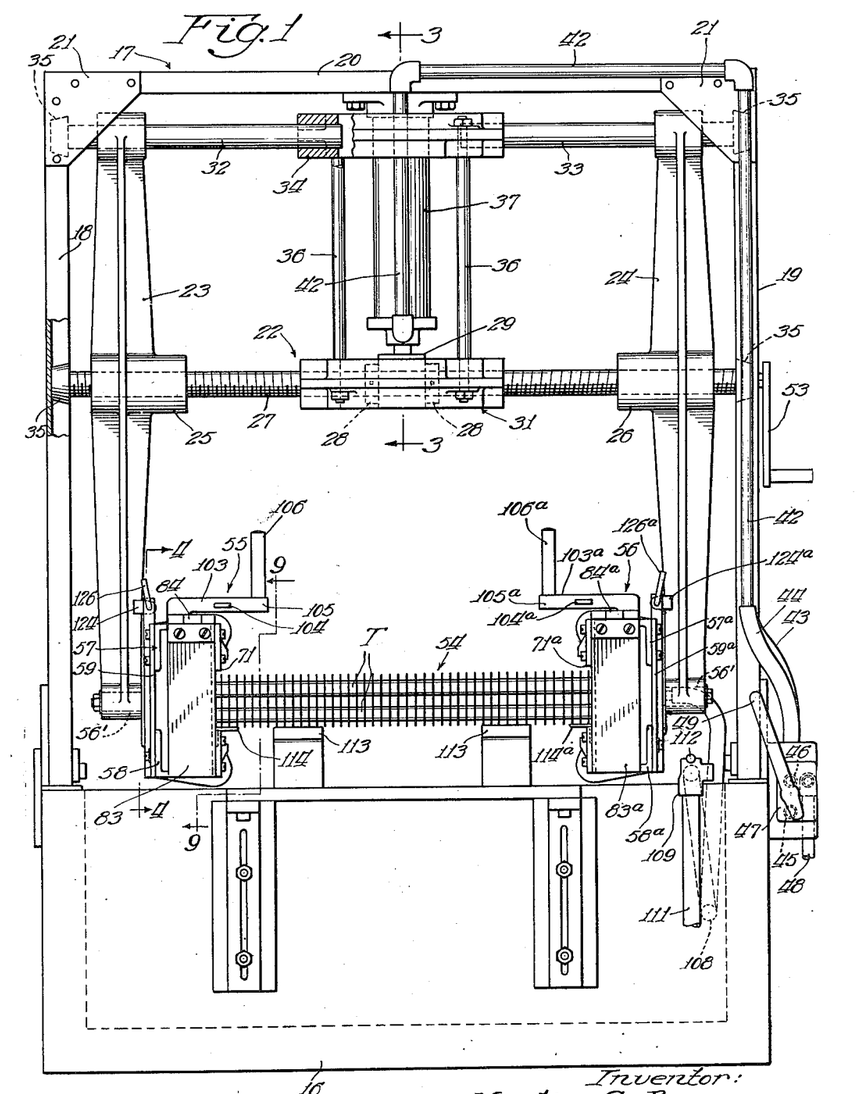
Fig. 1 is a front elevational view of a testing apparatus for radiator cores and the like, and embodying features of the present invention.
Figures 2, 3:
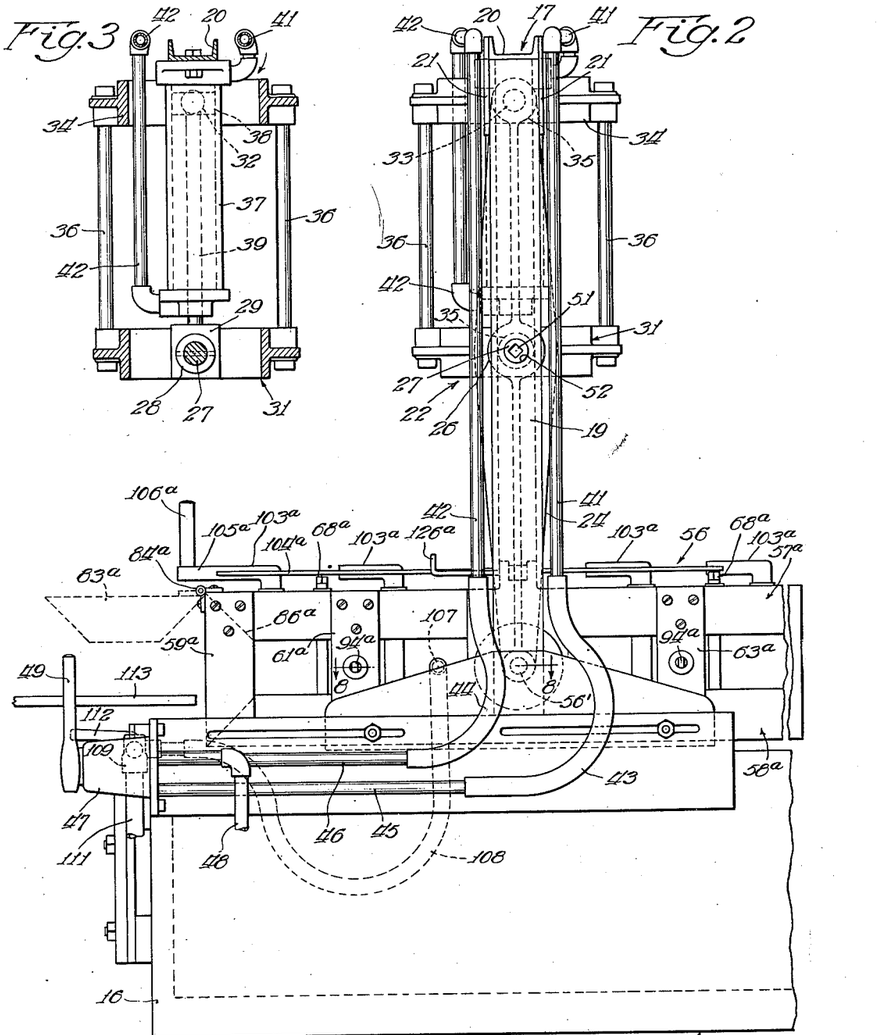
Fig. 2 is a side elevational view of the structure illustrated in Fig. 1.
Fig. 3 is a transverse sectional elevational view taken substantially as indicated by the line 3—3 of Fig. 1.
Figure 4:
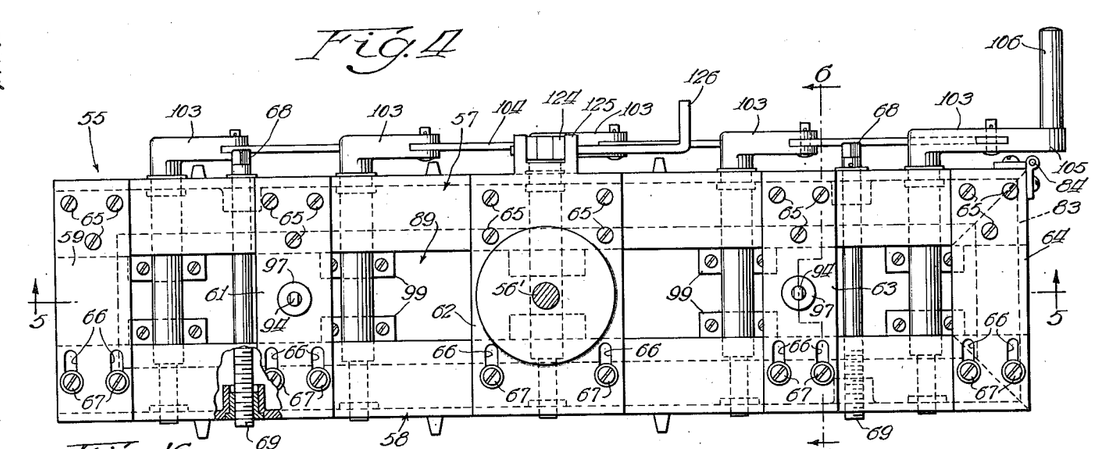
Fig. 4 is an enlarged side elevational view of one of the test fixtures illustrated in Fig. 1, the view being taken along the line and substantially as indicated by the line 4—4 thereof.

Referring particularly to Figs. 1 to 3, inclusive, the present invention, as illustrated therein, comprises a tank 16 adapted to contain a fluid such as water or the like, and mounted thereon is a standard indicated, as a whole, by the numeral 17 and comprising upright portions shown, in the present instance, as channel members 18 and 19 mounted on the side walls of the tank at opposite sides thereof, the upright portions 18 and 19 being connected adjacent their upper end portions with a cross-piece 20 secured thereto by corner plates 21.

Mounted in the standard 17 in a manner to be vertically movable therein is a fixture-supporting frame indicated, as a whole, by the numeral 22, and comprising a pair of vertically disposed relatively movable arms 23 and 24 having oppositely threaded portions 25 and 26, respectively formed adjacent their central portion adapted to receive the oppositely threaded end portions of a shaft 27 having collars 28 secured thereto and positioned at opposite sides of a block 29 forming part of an elevator frame indicated, as a whole by the numeral 31, the upper end portions of the arms 23 and 24 being slidably mounted on shafts 32 and 33, respectively, having their inner end portions rigidly mounted in a hollow or circular bracket 34 also forming a part of the elevator frame 31, while the outer end portion of the shafts 27, 32 and 33 are provided with anti-friction rollers 35 positioned in the channels 18 to be guided thereby, and to facilitate the vertical movement of the frame 22 in the standard 17, the portions 31 and 34 of the elevator frame being connected together by a plurality of rods 36.

For moving the fixture-supporting frame 22 in the standard 17, a cylinder 37 is rigidly mounted on the cross-piece 20 and provided with a piston 38 (Fig. 3) slidably mounted therein, the said piston having a rod 39 connected thereto, and to the lower end of which is connected the block 29.

Communicating with the upper end portion of the cylinder 37 is a conduit 41 (Figs. 2 and 3) for admitting a fluid, as, for example, compressed air to the interior of the cylinder at the upper side of the piston 38, and communicating with the lower end portion of the cylinder 37 is a conduit 42 for admitting compressed air or the like to the opposite or lower end of the cylinder and below the piston 38, the respective conduits 41 and 42 communicating through flexible hose connections 43 and 44, respectively, with conduits 45 and 46, respectively, mounted in a valve housing 47 provided with a supply pipe 48 and controlled by a manually operated handle or lever 49 for admitting air under pressure to either the upper or lower end portions of the cylinder 37.

For moving the arms 23 and 24 toward and away from each other to adapt the structure above described to radiator cores of various lengths, one end portion of the oppositely threaded shaft 27 is provided with a socket 51 (Fig. 2) adapted to be positioned adjacent an aperture 52 formed in the channel 19, and adapted to receive a wrench or crank handle 53 by which the shaft 27 may be rotated in either direction within the threaded portions 25 and 26 of the respective arms 23 and 24 and within the block 29 for moving the arms 23 and 24 in an inwardly or outwardly direction as may be desired.

For supporting a radiator core indicated, as a whole, by the numeral 54 (Fig. 1) on the lower end portions of the arms 23 and 24, is a pair of test fixtures indicated, respectively, and as a whole, by the numerals 55 and 56 having trunnions 56' formed thereon, and shown, in the present instance and preferably, as rotatably mounted in bearings at the lower end portions of the arms 23 and 24.

The test fixtures 55 and 56 are of substantially like construction except that they are formed in what might be termed left and right hand units, respectively, in order that they may function properly to engage the respective opposite end portions of the radiator core 54, and, in this specification, it is thought that a detailed description of the left hand fixture 55 will suffice for a thorough understanding of both units, but when portions of the right hand unit 56 (Fig. 1) are referred to specifically, the exponent *a* will be used in conjunction with the reference numeral of the corresponding part or portion referred to in the description of the fixture 55.

Figures 5, 16:
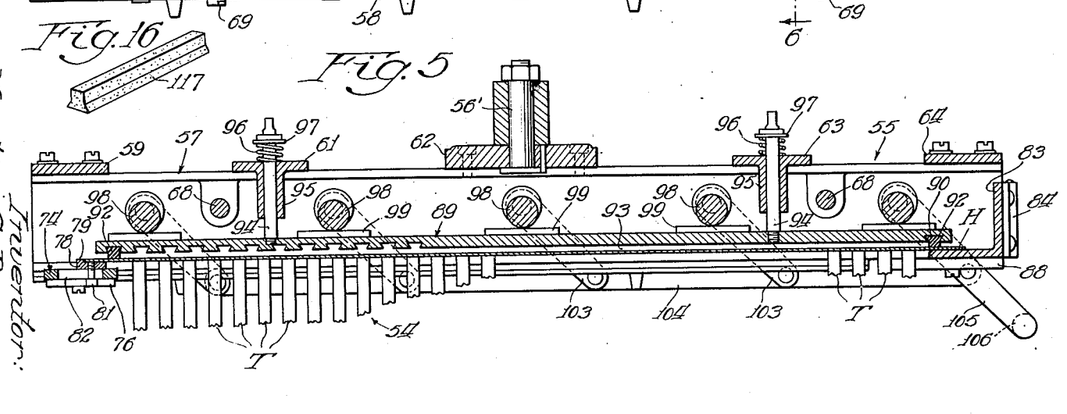
Fig. 5 is an elongated sectional elevational view taken substantially as indicated by the line 5—5 of Fig. 4.
Fig. 16 is an enlarged perspective view of a gasket unit of the type which may be employed with the plate structures illustrated in Figs. 13, 14, and 15.
Figures 6, 7, 8, 13, 14, 15:
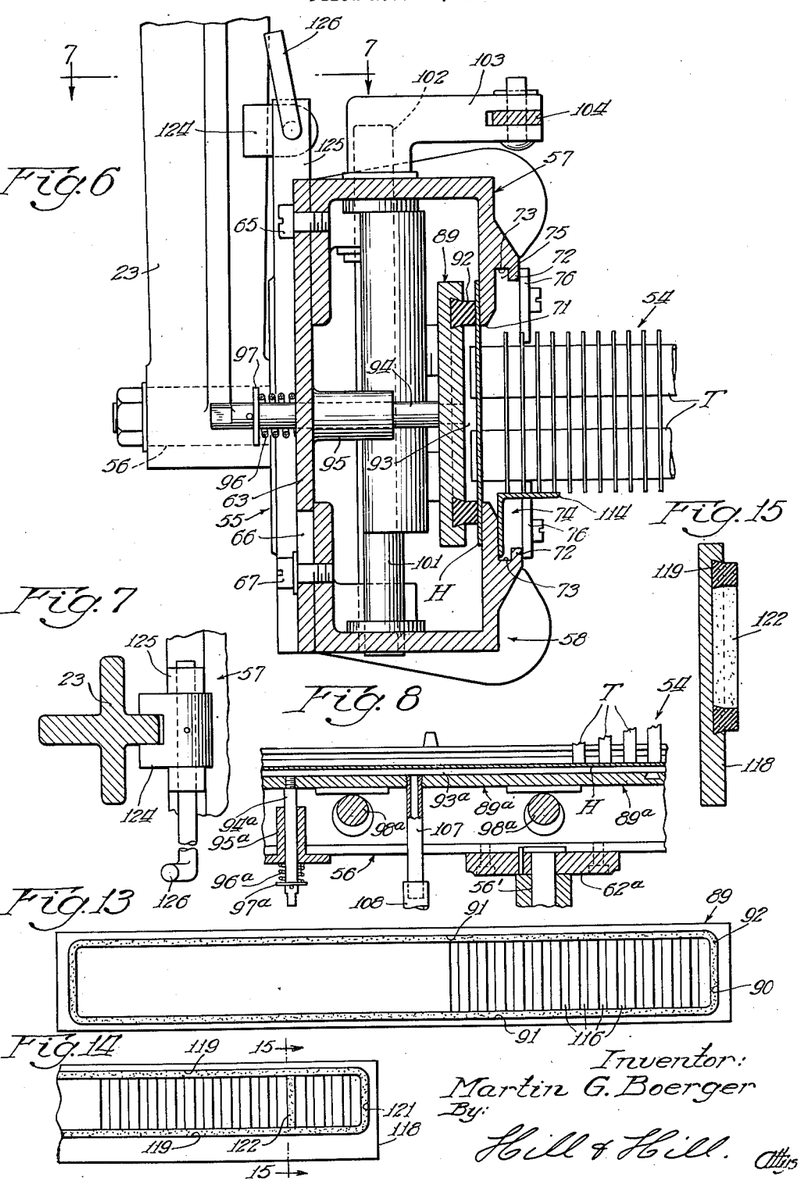
Fig. 6 is a further enlarged transverse sectional elevational view taken substantially as indicated by the line 6—6 of Fig. 4.
Fig. 7 is a fragmentary plan sectional view taken substantially as indicated by the line 7—7 of Fig. 6.
Fig. 8 is an enlarged fragmentary plan sectional view taken substantially as indicated by the line 8—8 of Fig. 2.
Fig. 13 is a face view of a sealing plate shown in the structures illustrated in Figs. 5, 6, and 12.
Fig. 14 is a fragmentary face view of a sealing plate employed in testing radiator cores of thinner dimension, and which may be substituted for the plate illustrated in Fig. 13.
Fig. 15 is an enlarged transverse sectional view of the structure illustrated in Fig. 14, and taken substantially as indicated by the line 15—15 thereof.

Referring now, particularly, to Figs. 4 to 7, inclusive, and Figs. 9 to 13, inclusive, illustrating the structure characterizing the left hand unit or test fixture 55, it will be observed that the unit or test fixture shown therein comprises a pair of oppositely disposed upper and lower elongated channel-like members 57 and 58, respectively, having their open side portions adjacent each other, and secured together at one side thereof and in spaced relation by means of connector plates 59, 61, 62, 63, and 64, the upper end portions of the connector plates being rigidly secured to the channel member 57 by means of bolts 65, and provided adjacent their lower end portions with slots 66 adapted to receive screw-threaded bolts 67 threaded into the channel members 58 and providing means whereby the channel member 58 may be adjusted with respect to the channel member 57 to provide a fixture of narrower vertical dimensions when it is desired to use the fixture for testing radiators of lesser thickness than the radiator shown in Fig. 6, for example.

For moving the channel members 57 and 58 relatively to each other for the purpose just described, a pair of adjusting screws 68 (Fig. 4) are rotatably mounted in the channel member 57 and provided with threaded lower end portions 69 operatively related to the channel member 58 in a manner to move the channels relatively toward and away from each other depending upon the direction of rotation of the adjusting screws 68, after which the channel members may be rigidly secured in relatively fixed position with respect to each by means of the screws 67 extending through the slots 66.

Figure 9:
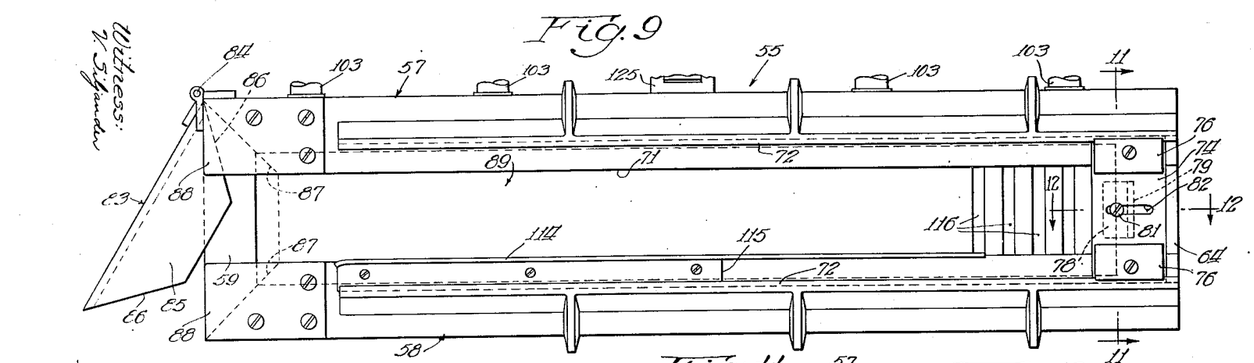
Fig. 9 is an enlarged side elevational view of one of the test fixtures illustrated in Fig. 1, and view in the direction opposite to Fig. 4, as indicated by the line 9—9 of Fig. 1.
Figures 10, 11:
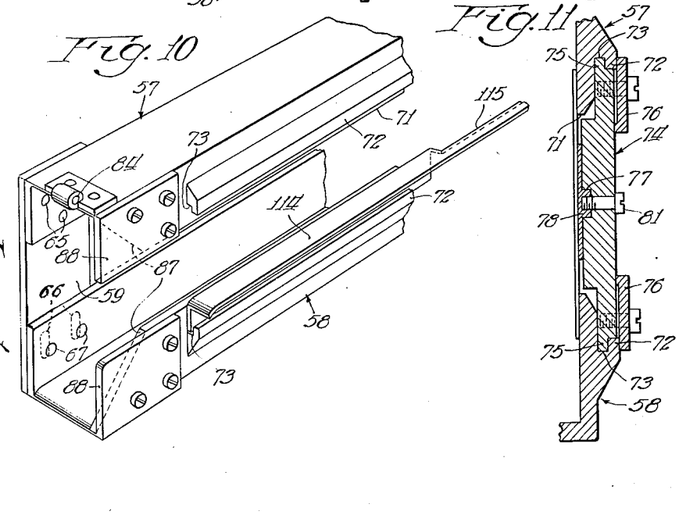
Fig. 10 is an enlarged fragmentary perspective view of the structure shown at the left hand portion of Fig. 9 with the hinged end plate thereof removed.
Fig. 11 is an enlarged transverse sectional elevational view of a portion of the structure illustrated in Fig. 9, and taken substantially as indicated by the line 11—11 thereof.

The respective test fixtures 55 and 56 are provided on their adjacent inner sides with elongated open side portions 71, as clearly illustrated in Figs. 6, 9, and 10, and the leg portions of the channel members 57 and 58 are provided on the open side portion of the fixture with elongated inwardly extending flanges 72, offset inwardly from the adjacent leg portions of the channels and extending substantially parallel thereto.

Slidably mounted in grooves 73 formed by the flanges 72 and adjacent leg portions of the respective channels 57 and 58 adjacent one end thereof, is an abutment plate indicated, as a whole, by the numeral 74 having tongue portions 75 positioned in the grooves 73, the said abutment plate being provided with clamping members 76 adjacent its upper and lower edge portions for securing the abutment plate 74 to the flanges 72 when the abutment plate 74 is in desired position. Slidably mounted in a horizontally disposed groove 77 formed in the abutment plate 74, is a stop member 78 having a flange or projecting portion 79 (Fig. 12) adjacent one of its vertical edges, against which, the header plate H of the radiator core 54 is intended to engage when the radiator is positioned within the respective test fixtures 55 and 56, the stop member 78 being secured in adjusted position with respect to the abutment plate 74 by means of a bolt 81 extending through an elongated horizontally disposed slot 82 formed in the abutment plate 74. It will be noted that the open side portions 71 of the respective fixtures are provided to permit tubes T of the radiator core to project from the fixtures, as clearly illustrated in Figs. 1 and 6.

Mounted adjacent the opposite or receiving end of the respective test fixtures, and, as clearly illustrated in Fig. 9, is an end plate providing an abutment 83 formed preferably of angle iron and shown, in the present instance, as pivotally or hingedly mounted at 84 on the upper channel member 57, the leg portion 85 of the end plate or abutment 83 being positioned in the plane of the inner leg portions of the channel members 57 and 58, and provided with cut-away end portions 86 adapted to engage correspondingly cut-away end portions 87 of the inner leg portions of the respective channel members, the said leg portions of the channel members adjacent the end plate 83 being provided with abutment-supporting plates 88, as clearly illustrated in Figs. 9 an 10.

Mounted in each of the test fixtures 55 and 56 is a sealing plate indicated, as a whole, by the numeral 89 having a continuous substantially rectangular groove indicated, as a whole, by the numeral 90 formed therein, the groove 90 having laterally spaced elongated portions 91, and adapted to receive an endless gasket 92 formed, preferably, of resilient material, such as rubber, or the like, and adapted to cooperate with the inner leg portions of the respective channels 57 and 58 adjacent the open side of the test fixture in a manner to secure the header plate H of the radiator core within the fixture, as clearly illustrated in Fig. 6, and to provide a pressure chamber indicated at 93 between the header plate H of the radiator core and the sealing plate 89, and adjacent the open end portions of the tubes T.

For supporting the sealing plate 89 in the fixture, a pair of supporting guide rods 94 are slidably mounted in bosses 95 formed on the connector plates 61 and 63, respectively, each of the rods 94 being provided with a coil spring 96 operating between the connector plates 61 and 63 and collars or washers 97 mounted on the respective rods for urging the sealing plate 89 and gasket 92 in one direction or away from the header plate H, and for moving the sealing plate in the opposite direction, a plurality of eccentric cams 98 are rotatably mounted in the respective channel members 57 and 58 and adapted to engage wear pieces 99 mounted on the rear side of the sealing plate 89, the lower end portion of the eccentric cams 98 being provided with trunnions 101 adapted to slide as well as rotate in the lower channel member 58 to permit of relative adjustment of the channel members in a manner to adapt the fixtures to radiator cores of lesser thickness. For actuating the respective eccentric cams 98 in unison, the trunnions 102 at the upper ends of the cam extend through the channel member 57, as clearly illustrated in Fig. 6, and are each provided adjacent their outer end portions with crank arms 103 connected together adjacent their free end portions by a bar 104, the end crank 103 near the receiving end of the fixture, adjacent the end plate of abutment 83, being extended as indicated at 105 and provided with a crank handle 106 to facilitate the operation of the respective cams. When the crank arms are moved in one direction, the cams 98 act to force the gasket 92 of the sealing plate 89 snugly against the header plate H of the radiator core when positioned within the fixture, and when the crank arms are moved in the opposite direction to release the sealing plate 89 from the influence of the cams 98, the spring 96 acts to move the sealing plate and gasket away from the header plate H of the radiator core.

It will be observed from the foregoing description that the inner leg portions of the channel members 57 and 58 adjacent the open side of the fixture, and the stop member 78 mounted on the abutment plate 74 adjacent one end of the fixture, together with the hinged end plate or abutment 83 adjacent the opposite end of the fixture, serve to resist the pressure exerted by the cams and gasket 92 against the header plate H in a manner to provide a substantially air-tight pressure chamber 93 adjacent the header plate and adjacent the open end portions of the tubes T.

As illustrated in Fig. 8, which is a fragmentary plan sectional view of a portion of the right hand fixture 56, an air conduit 107 is mounted in and extends through the the sealing plate 89a in a manner to communicate adjacent one of its ends with the pressure chamber 93a of the fixture 56, the opposite end of the conduit 107 being connected through a flexible conduit 108 (Figs. 1 and 2), such as a hose or the like, to a valve 109 having a pressure supply conduit 111 associated therewith and controlled by a manually operated valve lever 112.

It will be observed from the foregoing description that by actuating the air valve 109, pressure may be admitted to the chamber 93a of the fixture 56, the tubes T of the core 54 and the pressure chamber 93 of the fixture 55.

The pivotal mounting, in the lower end portions of the arms 23 and 24, of the trunnions 56' formed on the respective fixtures 55 and 56 provides a degree of flexibility in the mounting of the fixtures, and, if desired, a pair of table members or guides 113 may be mounted on the tank 16 to facilitate the positioning of the header plates H of the radiator core 54 within the respective fixtures, and to further assist in so positioning the core within the fixtures, each of the fixtures is provided on its inner or open side portion with a guide or supporting member 114 positioned adjacent the lower side of the open portion 71, the guide 114 being cut away adjacent one of its ends, as indicated at 115 (Fig. 10), to permit the longitudinal adjustment of the abutment plate 74 on the test fixture when adapting the fixture to cores of various widths.

Figure 12:
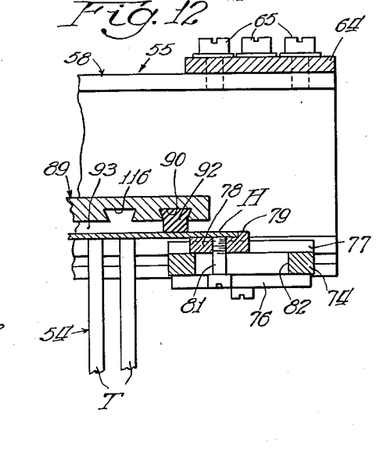
Fig. 12 is an enlarged plan sectional view taken substantially as indicated by the line 12—12 of Fig. 9, and illustrating a portion of a radiator core in relation to the structure disclosed.

As thus far described the operation of the apparatus is substantially as follows:

Assuming that there is no radiator core in the apparatus, and that the arms 103 have been moved to release the sealing plates 89 and 89a in a manner to permit the springs 96 to move the plates and gaskets thereon away from the abutments and inner side portions of the respective fixtures, the end plates or abutments 83 and 83a of the respective fixtures 55 and 56 may be raised to open the receiving end portion of the fixtures, and a radiator placed on the guides or tables 113 and moved forwardly over the tank and onto the guides 114 in a manner to position the header plates H of the core 54 within the respective fixtures and moved longitudinally therein until the leading edge portions of the header plates H engage the projection 79 on the stop member 78, as illustrated in Figs. 5 and 12, thereby properly positioning the header plate and tubes of the core 54 with respect to the sealing plates 89 and 89a of the respective fixtures, whereupon the end plates or abutments 83 may be swung downwardly to position the portion 85 thereof between the abutment-supporting plates 88 and the trailing end portions of the respective header plates, and thereafter, the crank arms 103 and 103a may be actuated by the handles 106 and 106a to rotate the eccentric cams 98 in a manner to move the gaskets 92 of the respective sealing plates 89 and 89a into engagement with the respective header plates H of the radiator core positioned in and between the respective fixtures.

When the core has been so positioned and secured within the respective fixtures, the control lever 49 of the valve 47 may be manipulated to permit air or other fluid pressure to enter the pipe 45, flexible connection 43 and conduit 41, and thence into the upper end portion of the cylinder 37 in a manner to move the fixture-supporting frame 22 downwardly and submerge the radiator core 54 mounted in the test fixture 55 and 56 in the fluid of the tank 16, whereupon the manually operated lever 112 may be manipulated to permit air under pressure to enter the pressure chambers 93 and 93a of the respective test fixtures and the tubes T of the radiator core in a manner to enable the operator to detect any leaks which might exist in the construction of the core. When this has been ascertained and the air pressure through the valve 109 has been shut off, the control lever 49 again may be manipulated to admit air pressure through the pipe 46, flexible hose connection 44 and conduit 42 into the lower portion of the cylinder 37 in a manner to elevate the fixture-supporting frame 22, fixtures 55—56, and core 54 to the position shown in Figs. 1 and 2, or into a position from which the tested core may be removed from the test fixtures.

Referring particularly to Fig. 13, it will be noted that the sealing plate 89 is provided with a plurality of transversely extending grooves 116 communicating adjacent their opposite ends with the elongated portions 91 of the continuous substantially rectangular groove 90, and adapted to receive relatively short substantially straight gasket members 117 of the character illustrated in Fig. 16, thereby adapting the plate 89 and structure thereof for use in testing radiators of narrower width than disclosed in the principal drawings of the present application, the adjustability of the abutment plate 74 and stop member 78 along the open side portion 71 of the fixture being provided to position the abutment plate according to the positioning of a short substantially straight gasket 117 in one or another of the transversely extending grooves 116.

It will be observed from the foregoing description that relative adjustability of the arms 23 and 24 of the fixture-supporting frame 22 adapts the apparatus to radiator cores of various lengths; that relative adjustability of the respective channel members 57 and 58 adapts the present device to radiator cores of various thicknesses; and that the positioning of the gasket 117 in the respective grooves 116 and the adjustability of the abutment plate 74 and stop member 78 adapts the present structure to radiator cores of various widths, thereby providing a wide range of adjustability in handling and testing radiator cores of various dimensions.

In Figs. 14 and 15 is illustrated a sealing plate 118 which may be employed for radiator cores of lesser thickness than that for which the plate of Fig. 13 is employed, and it will be noted that in the structure illustrated in Figs. 14 and 15, the elongated portions 119 of the continuous groove 121 are closer together than the elongated portions 91 of the continuous groove 90 of the sealing plate shown in Fig. 13, and that the transversely extending gasket 122 is of shorter dimension than one adapted for the grooves 116, thereby providing a structure and sealing plate which may be substituted for the sealing plate 89 when radiator cores of thinner dimension are to be tested.

For securing the respective fixtures 55 and 56 against rotation on their respective trunnions 51, the fixtures are provided, respectively, with latch members 124 and 124a adapted to engage, respectively, a portion of the respective fixture-supporting arms 23 and 24, as clearly illustrated in Figs. 1 and 7, the respective latch members being pivotally mounted in brackets 125 and 125a carried by the respective test fixtures and adapted to be actuated by hand levers 126 and 126a of the respective latch members.

It will be observed from the foregoing description that the present invention provides a novel construction and arrangement for handling and testing radiator cores to detect and locate possible leaks therein, and wherein the apparatus may be readily and conveniently adjusted to handle and test radiator cores of various lengths, depths and widths.

Obviously, the present invention is not limited to the precise construction and arrangement shown and described as the same may be variously modified. Moreover, all the features of the invention need not be used conjointly as the same may be used to advantage in variously different combinations and subcombinations.

What I claim as new and desire to secure by Letters Patent is:

1. In an apparatus of the class described, a test fixture comprising a hollow frame member having open end portions and an open side portion, an abutment plate slidably mounted and adjustable in said open side portion adjacent one end portion of the frame member, an end plate forming an abutment adjacent the opposite end portion of the frame member, a sealing plate movably mounted in said member and having a gasket thereon cooperable with portions of the frame member adjacent said open side portion and with said abutment plate and end plate for securing the header plate of a radiator core in the fixture, manually operated means for moving said sealing plate in one direction, and resilient means for urging the sealing plate normally in the opposite direction.

2. In an apparatus of the class described, a test fixture comprising an elongated hollow frame member having open end portions and an open side portion, an abutment plate slidably mounted and adjustable in said open side portion adjacent one end portion of the frame member, a stop slidably mounted on said abutment plate, an end plate movably mounted on said frame member and forming an abutment adjacent the opposite end portion thereof, a sealing plate movably mounted in said member and having a gasket thereon cooperable with portions of the frame member adjacent said open side portion and with said abutment plate and end plate for securing the header plate of a radiator core in the fixture, a manually operated cam for moving said sealing plate in one direction, and resilient means for urging the sealing plate normally in the opposite direction.

3. In an apparatus of the class described, a test fixture comprising an elongated hollow frame member having open end portions and an open side portion, an abutment plate slidably mounted and adjustable in said open side portion adjacent one end portion of the frame member, means for securing said plate thereto, a stop slidably mounted on said abutment plate, an end plate hingedly mounted on said frame member and forming an abutment adjacent the opposite end portion thereof, a sealing plate movably mounted in said member and having a gasket thereon cooperable with portions of the frame member adjacent said open side portion and with said abutment plate and end plate for securing the header plate of a radiator core in the fixture, a plurality of manually operated eccentric cams for moving said sealing plate toward said abutment plate and end plate, a compression spring for urging the sealing plate normally away from the abutment and end plates, and manually operated means for actuating said cams.

4. In an apparatus of the class described, a test fixture comprising an elongated hollow frame member having open end portions and an open side portion, a supporting stud mounted on said frame member, an abutment plate slidably mounted and adjustable in said open side portion adjacent one end portion of the frame member, means for securing the plate thereto, a stop slidably mounted in said abutment plate, an end plate hingedly mounted on said frame member and forming an abutment adjacent the opposite end portion thereof, a sealing plate movably mounted in said member and having a gasket thereon cooperable with portions of the frame member adjacent said open side portion and with said abutment plate and end plate for securing the header plate of a radiator core in the fixture, a plurality of eccentric cams rotatably mounted in said frame member and engageable with said sealing plate for moving the sealing plate toward said abutment plate and end plate, a plurality of compression springs for urging the sealing plate normally away from the abutment and end plates, manually operated means for actuating said cams, and an elongated radiator supporting bracket mounted on the open side portion of the frame member, said bracket having a cutaway portion at one of its ends adjacent said frame member for permitting movement of said abutment plate longitudinally thereof.

5. In an apparatus of the class described, a test fixture comprising a pair of oppositely disposed spaced channel members having their respective open side portions adjacent each other, a plurality of connector plates secured to opposed leg portions of the respective channel members at one side of the fixture, an abutment plate slidably mounted on the opposed leg portions of the respective channel members adjacent one end and at the opposite side of the test fixture, means for securing the abutment plate thereto, a stop member slidably mounted on said abutment plate and adapted to be secured thereto, an end plate forming an abutment adjacent the opposite end of the fixture, a sealing plate having a gasket cooperable with said abutment plate and end plate and with a portion of said fixture for securing the header plate of a radiator core therein, a plurality of eccentric cams rotatably mounted in said channel members and operatively related to said sealing plate for moving the plate and gasket thereon in one direction, and resilient means operatively related to certain of said connector plates and the sealing plate for moving said sealing plate and gasket in the opposite direction.

6. In an apparatus of the class described, a test fixture comprising a pair of oppositely disposed, relatively movable, spaced channel members having their respective open side portions adjacent each other, a plurality of connector plates secured to opposed leg portions of the respective channel members at one side of the fixture, said plates being adjustably secured adjacent one of their end portions to one of said channel members, adjusting means operatively related to the respective channel members, an abutment plate slidably mounted on the opposed leg portions of the respective channel members adjacent one end thereof and at the opposite side of the test fixture, means for securing the abutment plate thereto, a stop member adjustably mounted on said abutment plate and adapted to be secured in various positions of adjustment thereon, an end plate movably mounted on one of said channel members and forming an abutment adjacent the opposite end of the fixture, a sealing plate having a gasket cooperable with said abutment plate and end plate and with a portion of said channel members for securing the header plate of a radiator core in said test fixture, a plurality of eccentric cams rotatably mounted in the respective channel members and operatively related to said sealing plate for moving the plate and gasket thereon in one direction, and a plurality of springs operatively related to certain of said connector plates and the sealing plate for moving said sealing plate and gasket in the opposite direction.

7. In an apparatus of the class described, a test fixture comprising a pair of oppositely disposed spaced channel members having their respective open side portions adjacent each other, a plurality of connector plates secured to opposed leg portions of the respective channel members at one side of the fixture, said plates having slots formed therein adjacent one of their end portions adapted to receive bolts cooperable with one of said members for securing said plates thereto, adjusting screws rotatably mounted in one of said members and operatively related to the other member for moving the channel members relatively toward and away from each other, an abutment plate slidably and adjustably mounted on the opposed leg portions of the respective channel members adjacent one end thereof and at the opposite side of the test fixture, means for securing the abutment plate thereto, a stop member slidably and adjustably mounted on said abutment plate and adapted to be secured in various positions of adjustment with respect thereto, an end plate hingedly mounted on one of said channel members and forming an abutment adjacent the opposite end of the fixture, a sealing plate having a gasket cooperable with said abutment plate and end plate and with a portion of said channel members for securing the header plate of a radiator core in said test fixture, a plurality of eccentric cams rotatably mounted in said channel members and slidable relatively with respect to one of said members, said cams being operatively related to said sealing plate for moving the plate and gasket thereon in one direction, a plurality of guide rods secured to the sealing plate and slidably mounted in certain of said connector plates, and a plurality of compression springs operatively related to said certain of the connector plates and said guide rods for moving said sealing plate and gasket in the opposite direction.

8. In an apparatus of the class described, a test fixture comprising a pair of oppositely disposed spaced channel members, each having substantially parallel leg portions and having their respective open side portions adjacent each other, a plurality of connector plates secured to opposed leg portions of the respective channel members at one side of the fixture, the opposed leg portions on the respective channel members at the opposite side of the fixture having oppositely disposed inwardly projecting flanges formed thereon and extending substantially parallel thereto, an abutment plate slidably mounted on said flanges of the respective channel members adjacent one end thereof and at the side of the test fixture adjacent said last mentioned leg portions, means for securing the abutment plate to said flanges, a stop member slidably mounted on said abutment plate and adapted to be secured thereto, an end plate forming an abutment adjacent the opposite end of the fixture, a sealing plate having a gasket cooperable with said abutment plate and end plate and with a portion of said last mentioned leg portions for securing the header plate of a radiator core in said test fixture, a plurality of eccentric cams rotatably mounted in said channel members and operatively related to said sealing plate for moving the plate and gasket thereon in one direction, and resilient means operatively related to certain of said connector plates and the sealing plate for moving said sealing plate and gasket in the opposite direction.

9. A test fixture comprising a pair of oppositely disposed, relatively adjustable, spaced channel members forming a hollow frame member having an open side portion and open end portions adjacent the opposite ends of said open side, an abutment slidably mounted on said channel members for spanning said open side adjacent one end thereof, a second abutment hingedly mounted on one of said channel members adjacent the opposite end of said open side portion, and sealing means operatively related to portions of said channel members adjacent the open side of said frame member and with said abutments on the sides thereof interior of said hollow frame member.

MARTIN G. BOERGER.